(12) United States Patent
Robidoux et al.

(10) Patent No.: US 6,804,794 B1
(45) Date of Patent: Oct. 12, 2004

(54) ERROR CONDITION HANDLING

(75) Inventors: Gregory Robidoux, Westboro, MA (US); John Walton, Mendon, MA (US)

(73) Assignee: EMC Corporation, Hopkinton, MA (US)

(*) Notice: Subject to any disclaimer, the term of this patent is extended or adjusted under 35 U.S.C. 154(b) by 586 days.

(21) Appl. No.: 09/796,259

(22) Filed: Feb. 28, 2001

(51) Int. Cl.[7] .............................................. G06F 11/00
(52) U.S. Cl. .................................. 714/5; 714/42
(58) Field of Search ............................ 714/5, 41, 42; 709/318

(56) References Cited

U.S. PATENT DOCUMENTS

| | | | |
|---|---|---|---|
| 5,537,052 A | | 7/1996 | Wilson et al. |
| 5,890,207 A | | 3/1999 | Sne et al. |
| 5,905,858 A | * | 5/1999 | Jeddeloh ..................... 714/52 |
| 5,943,287 A | | 8/1999 | Walton |
| 5,951,693 A | | 9/1999 | Walton et al. |
| 5,953,265 A | | 9/1999 | Walton et al. |
| 6,058,451 A | | 5/2000 | Bermingham et al. |
| 6,195,770 B1 | | 2/2001 | Walton |
| 6,334,193 B1 | * | 12/2001 | Buzsaki ........................ 714/2 |
| 6,363,502 B1 | * | 3/2002 | Jeddeloh ..................... 714/52 |
| 6,526,529 B1 | * | 2/2003 | Miksovsky et al. ........... 714/57 |
| 6,587,547 B1 | * | 7/2003 | Zirngibl et al. .......... 379/88.17 |

* cited by examiner

Primary Examiner—Scott Baderman
(74) Attorney, Agent, or Firm—Scott A. Quellette; Krishnendu Gupta; John M. Gunther (57) ABSTRACT

In one embodiment of the present invention, a memory controller is provided that includes both a first processor and a second processor. If a memory device controlled by the controller indicates to the controller that an error condition exists in the device, either the first processor or the second processor is selected to handle the error condition. If the first processor is selected to handle the error condition, the first processor handles the error condition according to one or more statically preprogrammed error handling routines. Conversely, if the second processor is selected to handle the error condition, the second processor handles the error condition according to one or more dynamically programmable error handling routines.

18 Claims, 5 Drawing Sheets

ERROR CONDITION HANDLING

BACKGROUND OF THE INVENTION

1. Field of the Invention

The present invention relates generally to a technique for handling an error condition in a memory device, and more specifically, to such a technique wherein at least certain of the specific routines that may be used to handle the error condition may be dynamically modified.

2. Brief Description of Related Prior Art

Network computer systems generally include a plurality of geographically separated or distributed computer nodes that are configured to communicate with each other via, and are interconnected by, one or more network communications media. One conventional type of network computer system includes a network storage subsystem that is configured to provide a centralized location in the network at which to store, and from which to retrieve data. Advantageously, by using such a storage subsystem in the network, many of the network's data storage management and control functions may be centralized at the subsystem, instead of being distributed among the network nodes.

One type of conventional network storage subsystem, manufactured and sold by the Assignee of the subject application (hereinafter "Assignee") under the tradename Symmetrix™ (hereinafter referred to as the "Assignee's conventional storage system"), includes a plurality of disk mass storage devices configured as one or more redundant arrays of independent (or inexpensive) disks (RAID). The disk devices are controlled by disk controllers (commonly referred to as "back end" controllers/directors) that are coupled via a bus system to a shared cache memory resource in the subsystem. The cache memory resource is also coupled via the bus system to a plurality of host controllers (commonly referred to as "front end" controllers/directors). The disk controllers are coupled to respective disk adapters that, among other things, interface the disk controllers to the disk devices. Similarly, the host controllers are coupled to respective host channel adapters that, among other things, interface the host controllers via channel input/output (I/O) ports to the network communications channels (e.g., SCSI, Enterprise Systems Connection (ESCON), or Fibre Channel (FC) based communications channels) that couple the storage subsystem to computer nodes in the computer network external to the subsystem (commonly termed "host" computer nodes or "hosts").

In the Assignee's conventional storage system, the shared cache memory resource comprises a relatively large amount of synchronous dynamic random access memory (SDRAM) that is segmented into a multiplicity of cache memory regions. Each respective cache memory region may comprise, among other things, a respective memory array and a respective pair of memory region I/O controllers. The memory array comprised in a respective memory region may be configured into a plurality of banks of SDRAM devices (which each such bank comprising multiple 64, 128, or 256 megabit SDRAM integrated circuit chips) that are interfaced with the respective memory region's I/O controllers via a plurality of respective sets of command and data interfaces.

The I/O controllers in a respective memory region perform, based upon commands received from the host and disk controllers, relatively high level control and memory access functions in the respective memory region. For example, based upon commands received from the host and disk controllers, each I/O controller in a respective memory region may perform arbitration operations with the other I/O controller in the region so as to ensure that only one of the I/O controllers in the region is permitted to be actively accessing/controlling the memory array at any given time. Additionally, each I/O controller in a respective memory region may perform address decoding operations whereby a memory address supplied to the I/O controller by a host controller or a disk controller, as part of a memory access request (e.g., a memory read or write request) from the host controller or disk controller to the I/O controller, may be decoded by the I/O controller into a physical address in the memory region's memory array that corresponds to the address supplied by the host controller or disk controller. Other functions of the I/O controllers in a respective memory region include, among other things, temporary storage and transfer synchronization of data moving between the bus system and the memory array in the respective region, and as will described more fully below, the handling of error conditions that may arise in the memory array.

Conversely, the command and data interfaces in a respective memory region perform, based upon commands received from the I/O controllers (e.g., via command/control signal busses coupling the I/O controllers to the interfaces), relatively low level control and memory access functions in the respective memory region. For example, these interfaces may provide, in response to a memory access request supplied to the interfaces from an I/O controller, appropriate chip select, clock synchronization, memory addressing, data transfer, memory control/management, and clock enable signals to the memory devices in the memory array that permit the requested memory access to occur.

When the memory array encounters an error condition, the command and data interfaces may detect the occurrence of the error condition and may report such occurrence to the I/O controller that currently is actively accessing/controlling the memory array (hereinafter termed the "active I/O controller"). Typical error conditions that may be detected and reported by the command and data interfaces include the occurrence of parity errors in the values transmitted by the command/control signal busses, the failure of a requested directed memory access to complete within a predetermined "timeout" period, etc.

The command and data interfaces signal the occurrence of an error condition. by asserting an error signal line that is coupled to the active I/O controller. The assertion of the error signal line merely indicates that an error condition has been detected in the memory array, but does not indicate the nature or type of error condition detected. In response to the assertion of the error signal line, the active I/O controller may report the occurrence of the error condition to a host controller or disk controller that is currently seeking to access the memory array using the active I/O controller; the active I/O controller may also execute one or more error handling routines to try to determine the cause of the error condition, and to correct the error condition.

The structure and operation of the circuitry comprising a memory region are sufficiently complex that it is essentially impossible to anticipate in advance all of the possible causes of memory array.error conditions that may be reported to the I/O controllers, and to anticipate in advance how to correct all of such error conditions when they occur. In the Assignee's conventional storage system, the error handling routines that may be executed by an I/O controller in response to the reporting of a memory array error condition are statically preprogrammed into the I/O controller. This is unfortunate, since it inherently limits the ability of the I/O controller to appropriately handle memory array error conditions that may arise from causes that were not anticipated in advance of, the initial programming of the I/O controller.

SUMMARY OF THE INVENTION

Accordingly, in broad concept, the present invention provides a technique for handling error conditions that may occur in a memory device, in which technique at least certain of the error handling routines that may be used to handle the error condition may be dynamically modified (i.e., programmed and/or changed during the operation of the controller, e.g., while the controller is being used to control the memory device). In one embodiment of the present invention, a memory controller is provided that may control a memory device (e.g., a memory array comprised in a cache memory region in a data storage system). The controller may include both a first processor and a second processor. If the memory device reports to the controller that an error condition exists in the device, either the first processor or the second processor may be selected to handle the error condition. If the first processor is selected to handle the error condition, the first processor may handle the error condition according to one or more statically preprogrammed error handling routines. Conversely, if the second processor is selected to handle the error condition, the second processor may handle the error condition according to one or more dynamically programmable error handling routines.

The controller itself may comprise a selector that selects whether the first processor or the second processor is to handle the error condition. Alternatively, a device external to the controller (e.g., a host controller, disk controller, computer device external to the network data storage system, and/or other control circuitry associated with the controller) may be used to select whether the first processor or the second processor handles the error condition.

During the operation of the controller, a computer device external to the controller may transmit to the controller a first set of instructions. When the controller receives the first set of instructions from the external computer device, the controller may forward the instructions to and cause them to be stored in RAM comprised in the controller. Alternatively, the controller may store the first set of instructions in RAM that is external to the controller. The first set of instructions may comprise the one or more error handling routines according to which the second processor may handle the error condition. That is, the second processor may access the one or more error handling routines comprised in the first set of instructions stored in the RAM, and may execute the one or more routines to handle the error condition.

After the RAM has received and stored the first set of instructions, during the operation of the controller, the external computer device may transmit to the controller a second set of instructions that differ from the first set of instructions. When the controller receives the second set of instructions from the external computer device, the controller may forward them to and cause them to be stored in the RAM. This may result in at least portions of the first set of instructions being overwritten in the RAM by the second set of instructions. The second set of instructions may comprise one or more error handling routines that differ from those comprised in the first set of instructions. The second processor may access the one or more error handling routines comprised in the second set of instructions stored in the RAM, and may execute them to handle the error condition.

The execution by the second processor of the one or more error handling routines in the second set of instructions may cause the error condition to be handled by the second processor in a manner that is different from the manner in which the error condition may be handled by the second processor when the second processor executes the one or more error handling routines in the first set of instructions.

In one aspect of the present invention, a memory controller embodying features of the technique of the present invention is provided. In a second aspect of the present invention, a method of using or operating such a controller is provided. In a third aspect of the present invention, computer-readable memory comprising executable program instructions is provided. The program instructions, when executed, cause features of the present invention to be implemented.

Thus, in the present invention, the error handling routines that may be executed by the memory controller to handle a memory error condition may be dynamically modified, and the memory controller may handle the error condition in accordance with either statically preprogrammed or dynamically programmable error handling routines. Advantageously, these features of the present invention permit a memory controller made according to the present invention to be better able than the prior art to appropriately handle memory error conditions that may arise from causes that were not anticipated in advance of the initial programming of the controller. Also advantageously, these features of the present invention permit there to be greater flexibility in the manner in which memory error conditions may be dealt with, according to the present invention, compared to the prior art.

These and other features and advantages of the present invention will become apparent as the following Detailed Description proceeds and upon reference to the Figures of the Drawings, in which like numerals depict like parts, and wherein:

Although the following Detailed Description will proceed with reference being made to illustrative embodiments and methods of use of the present invention, it should be understood that it is not intended that the present invention be limited to these illustrative embodiments and methods of use. On contrary, many alternatives, modifications, and equivalents of these illustrative embodiments and methods of use will be apparent to those skilled in the art. For example, although the subject invention will be described as being used to advantage in connection with a memory system in a network data storage subsystem, the subject invention may be used in connection with other types of memory systems. Accordingly, the present invention should be viewed broadly as encompassing all such alternatives, modifications, and equivalents as will be apparent to those skilled in art, and should be viewed as being defined only as forth in the hereinafter appended claims.

DETAILED DESCRIPTION OF ILLUSTRATIVE EMBODIMENTS

Figure 1:
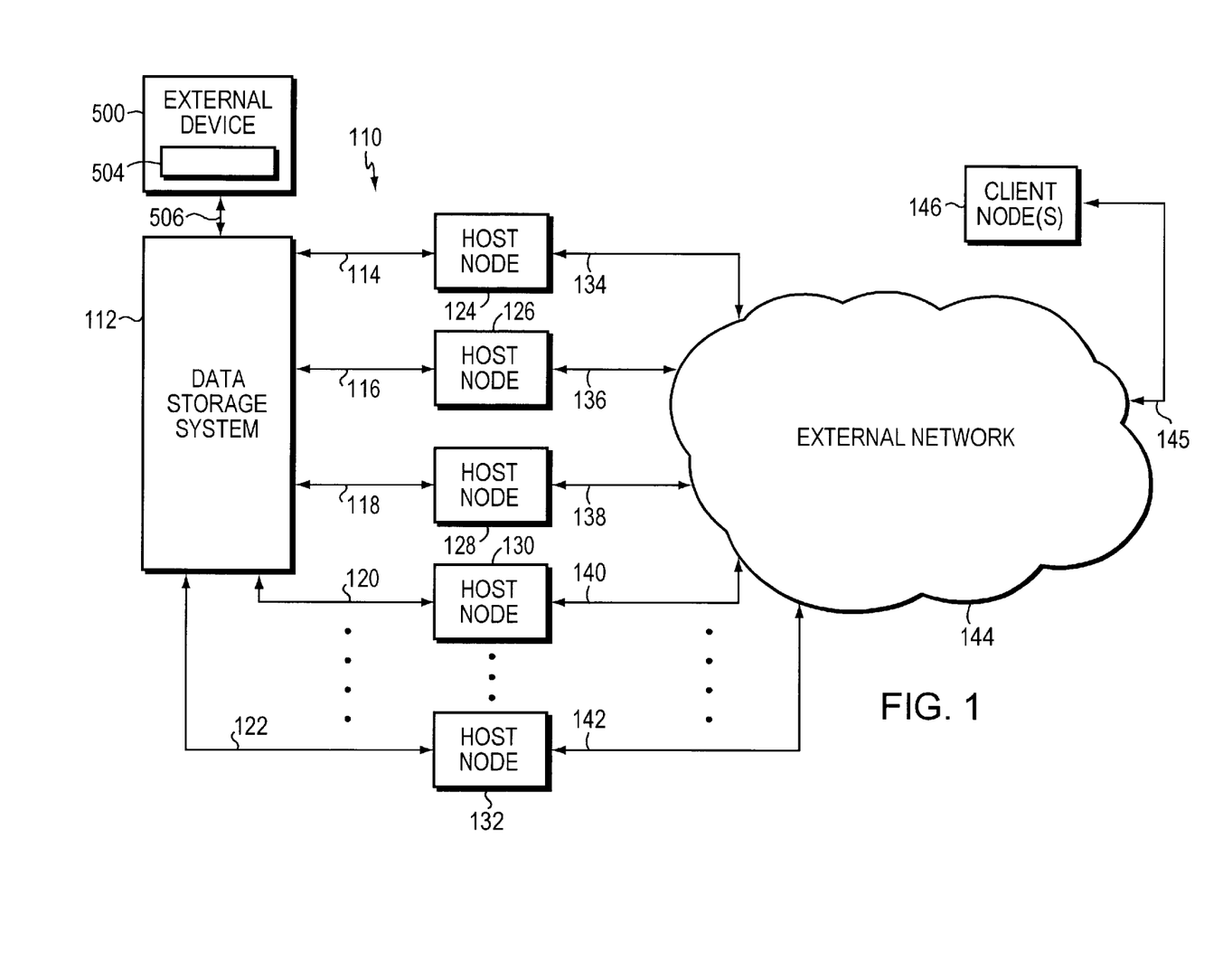
FIG. 1 is a high level schematic block diagram of a data storage network that includes a data storage system wherein one embodiment of the present invention may be practiced to advantage.

Turning now to FIGS. 1–5, illustrative embodiments of the present invention will be described. FIG. 1 is a high level block diagram illustrating a data storage network 110 that includes a data storage system 112 wherein one embodiment of the subject invention may be practiced to advantage. System 112 is coupled via FC protocol optical communication links 114, 116, 118, 120, . . . 122 to respective host computer nodes 124, 126, 128, 130, . . . 132. Host nodes 124, 126, 128, 130, . . . 132 are also coupled via additional respective conventional network communication links 134, 136, 138, 140, . . . 142 to an external network 144. Network 144 may comprise one or more Transmission Control Protocol/Internet Protocol (TCP/IP)-based and/or Ethernet-based local area and/or wide area networks. Network 144 is also coupled to one or more client computer nodes (collectively or singly referred to by numeral 146 in FIG. 1) via network communication links (collectively referred to by numeral 145 in FIG. 1). The network communication protocol or protocols utilized by the links 134, 136, 138, 140, . . . 142, and 145 are selected so as to ensure that the nodes 124, 126, 128, 130, . . . 132 may exchange data and commands with the nodes 146 via network 144.

Host nodes 124, 126, 128, 130, . . . 132 may be any one of several well known types of computer nodes, such as server computers, workstations, or mainframes. In general, each of the host nodes 124, 126, 128, 130, . . . 132 and client nodes 146 comprises a respective computer-readable memory (not shown) for storing software programs and data structures associated with, and for carrying out the functions and operations described herein as being carried by these nodes 124, 126, 128, 130, . . . 132, and 146. In addition, each of the nodes 124, 126, 128, 130, . . . 132, and 146 further includes one or more respective processors (not shown) and network communication devices for executing these software programs, manipulating these data structures, and for permitting and facilitating exchange of data and commands among the host nodes 124, 126, 128, 130, . . . 132 and client nodes 146 via the communication links 134, 136, 138, 140, . . . 142, network 144, and link[[s]] 145. The execution of the software programs by the processors and network communication devices included in the hosts 124, 126, 128, 130, . . . 132 also permits and facilitates exchange of data and commands among the nodes 124, 126, 128, 130, . . . 132 and the system 112 via the FC links 114, 116, 118, 120, . . . 122, in the manner that will be described below.

Figure 2:
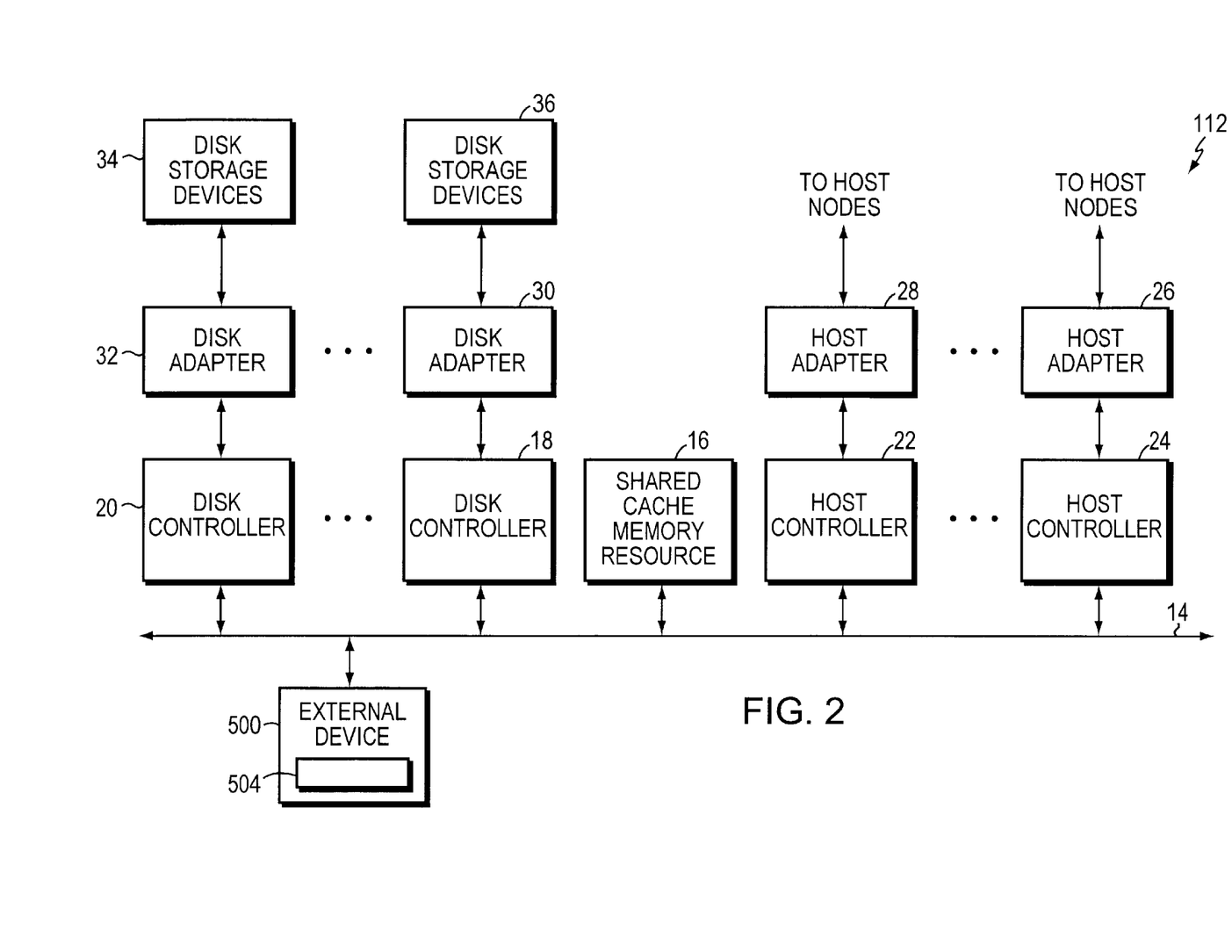
FIG. 2 is a high level schematic block diagram illustrating functional components of the data storage system included in the data storage network shown in FIG. 1.

FIG. 2 is a high level schematic block diagram of functional components of the system 112. System 112 includes a bus system 14 that electrically couples together a plurality of host controllers 22 . . . 24, a plurality of disk controllers 18 . . . 20, and a shared cache memory resource 16. Bus system 14 may include a plurality of redundant buses (not shown) and bus arbitration and control system (also not shown).

Each host controller 22 . . . 24 may comprise a single respective circuit board or panel. Likewise, each disk controller 18 . . . 20 may comprise a single respective circuit board or panel. Each disk adapter 30 . . . 32 may comprise a single respective circuit board or panel. Likewise, each host adapter 26 . . . 28 may comprise a single respective circuit board or panel. Each host controller 22 . . . 24 may be electrically and mechanically coupled to a respective host adapter 28 . . . 26, respectively, via a respective mating electromechanical coupling system.

In this embodiment of system 112, although not shown explicitly in the Figures, each host adapter 26 . . . 28 may be coupled to four respective host nodes via respective FC links. For example, in this embodiment of system 112, adapter 26 may be coupled to host nodes 124, 126, 128, 130 via respective FC links 114, 116, 118, 120. It should be appreciated that the number of host nodes to which each host adapter 26 . . . 28 may be coupled may vary, depending upon the particular configurations of the host adapters 26 . . . 28, and host controllers 22 . . . 24, without departing from the present invention.

Disk adapter 32 is electrically coupled to a set of mass storage devices 34, and interfaces the disk controller 20 to those devices 34 so as to permit exchange of data and commands between processors (not shown) in the disk controller 20 and the storage devices 34. Disk adapter 30 is electrically coupled to a set of mass storage devices 36, and interfaces the disk controller 18 to those devices 36 so as to permit exchange of data and commands between processors (not shown) in the disk controller 18 and the storage devices 36. The devices 34, 36 may be configured as redundant arrays of magnetic and/or optical disk mass storage devices.

It should be appreciated that the respective numbers of the respective functional components of system 112 shown in FIG. 2 are merely for illustrative purposes, and depending upon the particular application to which the system 112 is intended to be put, may vary without departing from the present invention. It may be desirable, however, to permit the system 112 to be capable of failover fault tolerance in the event of failure of a particular component in the system 112. Thus, in practical implementation of the system 112, it may be desirable that the system 112 include redundant functional components and a conventional mechanism for ensuring that the failure of any given functional component is detected and the operations of any failed functional component are assumed by a respective redundant functional component of the same type as the failed component.

The general manner in which data may be retrieved from and stored in the system 112 will now be described. Broadly speaking, in operation of network 110, a client node 146 may forward a request to retrieve data to a host node (e.g., node 124) via one of the links 145 associated with the client node 146, network 144 and the link 134 associated with the host node 124. If data being requested is not stored locally at the host node 124, but instead, is stored in the data storage system 112, the host node 124 may request the forwarding of that data from the system 112 via the FC link 114 associated with the node 124.

The request forwarded via link 114 is initially received by the host adapter 26 coupled to that link 114. The host adapter 26 associated with link 114 may then forward the request to the host controller 24 to which it is coupled. In response to the request forwarded to it, the host controller 24 may then ascertain from data storage management tables (not shown) stored in the cache 16 whether the data being requested is currently in the cache 16; if the requested data is currently not in the cache 16, the host controller 24 may request that the disk controller (e.g., controller 18) associated with the storage devices 36 within which the requested data is stored retrieve the requested data into the cache 16. In response to the request from the host controller 24, the disk controller 18 may forward via the disk adapter to which it is coupled appropriate commands for causing one or more of the disk devices 36 to retrieve the requested data. In response to such commands, the devices 36 may forward the requested data to the disk controller 18 via the disk adapter 30. The disk controller 18 may then store the requested data in the cache 16.

When the requested data is in the cache 16, the host controller 24 may retrieve the data from the cache 16 and forward it to the host node 124 via the adapter 26 and link 114. The host node 124 may then forward the requested data to the client node 146 that requested it via the link 134, network 144 and the link 145 associated with the client node 146.

Additionally, a client node 146 may forward a request to store data to a host node (e.g., node 124) via one of the links 145 associated with the client node 146, network 144 and the link 134 associated with the host node 124. The host node 124 may store the data locally, or alternatively, may request the storing of that data in the system 112 via the FC link 114 associated with the node 124.

The data storage request forwarded via link 114 is initially received by the host adapter 26 coupled to that link 114. The host adapter 26 associated with link 114 may then forward the data storage request to the host controller 24 to which it is coupled. In response to the data storage request forwarded to it, the host controller 24 may then initially store the data in cache 16. Thereafter, one of the disk controllers (e.g., controller 18) may cause that data stored in the cache 16 to be stored in one or more of the data storage devices 36 by issuing appropriate commands for same to the devices 36 via the adapter 30

Figure 3:
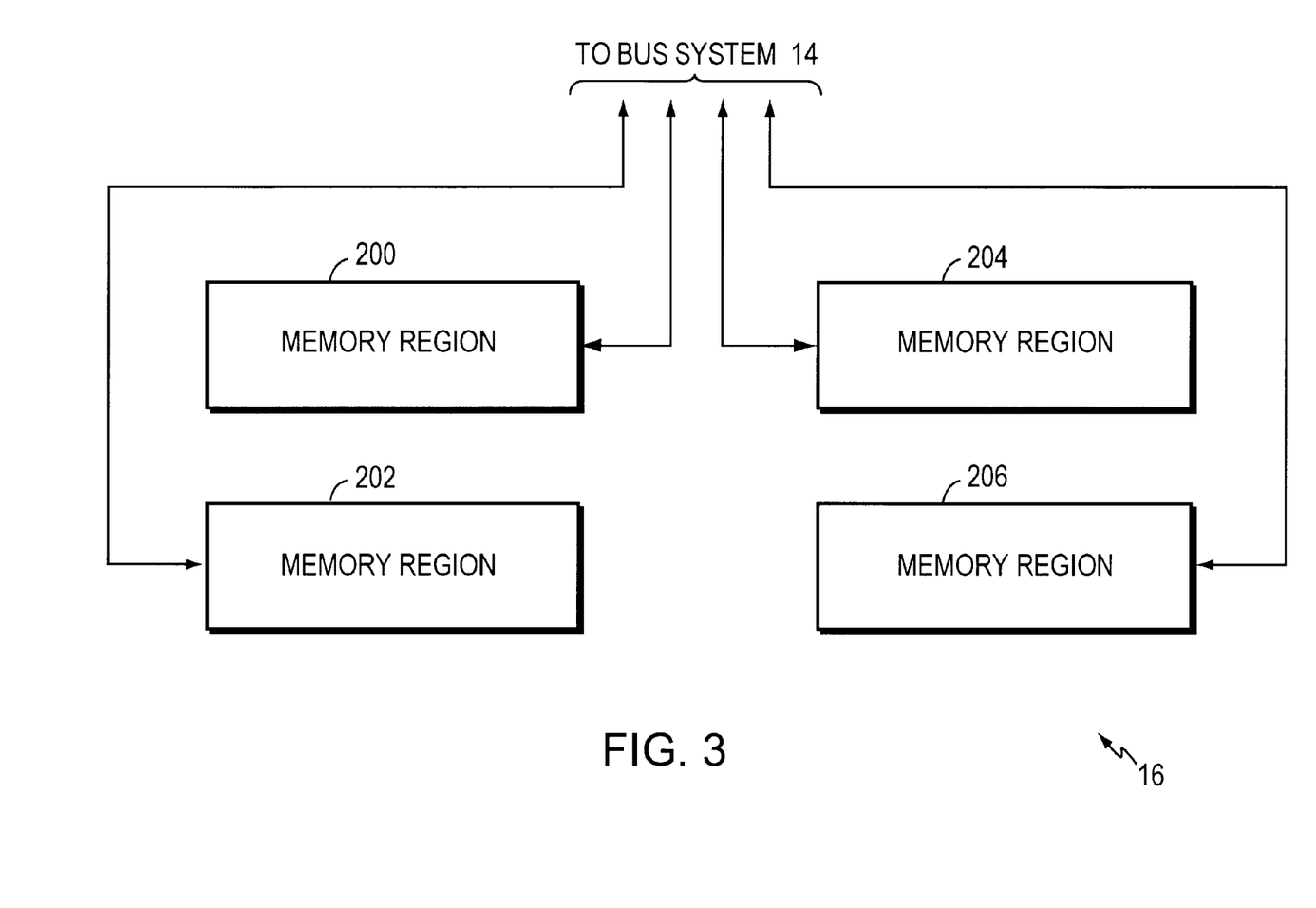
FIG. 3 is a high level schematic block diagram illustrating functional components of the shared cache memory resource of the data storage system of FIG. 2.
Figure 4:
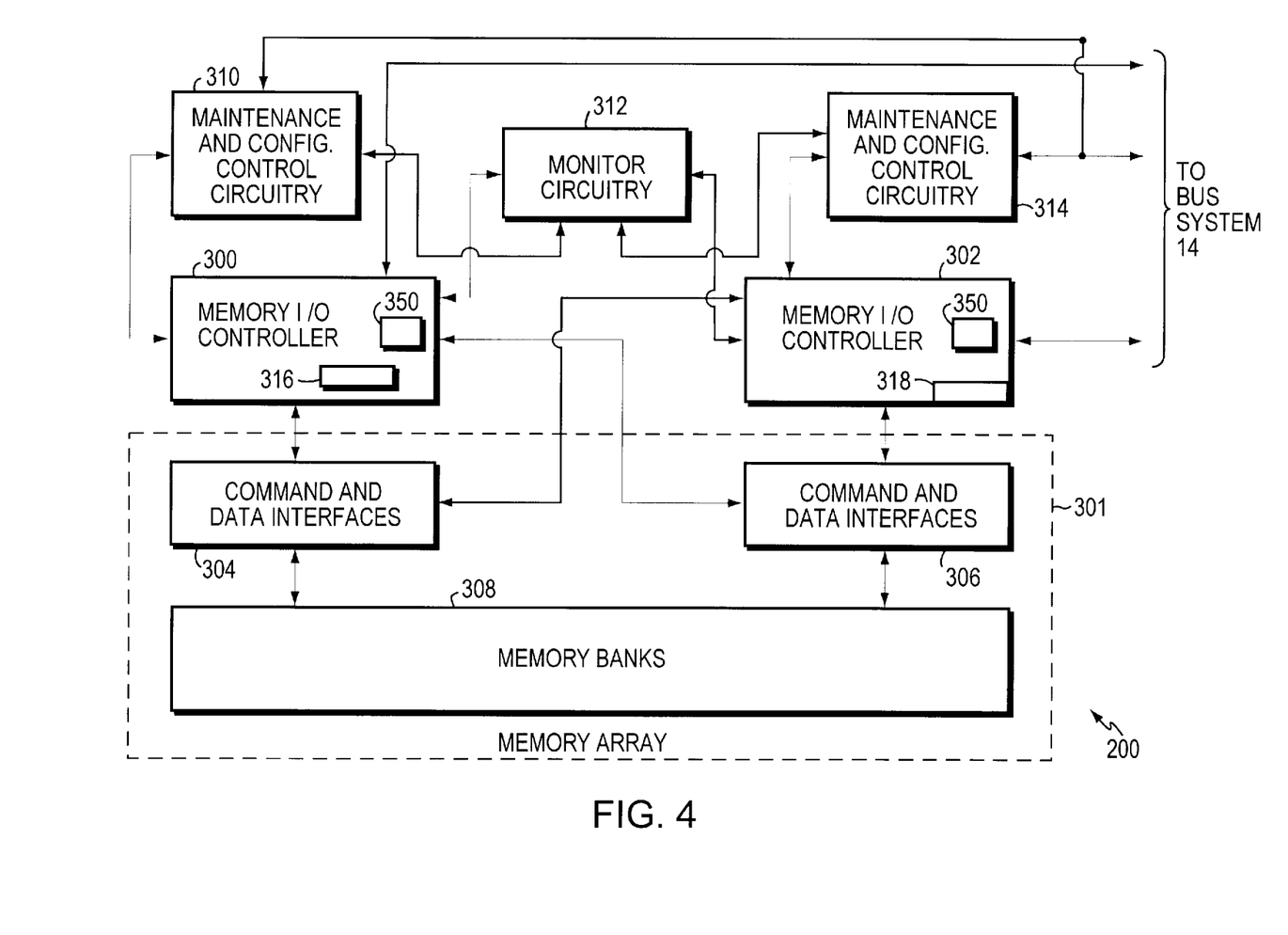
FIG. 4 is a high level schematic block diagram illustrating functional components of a memory region that may be comprised in the shared cache memory resource of FIG. 3.
Figure 5:
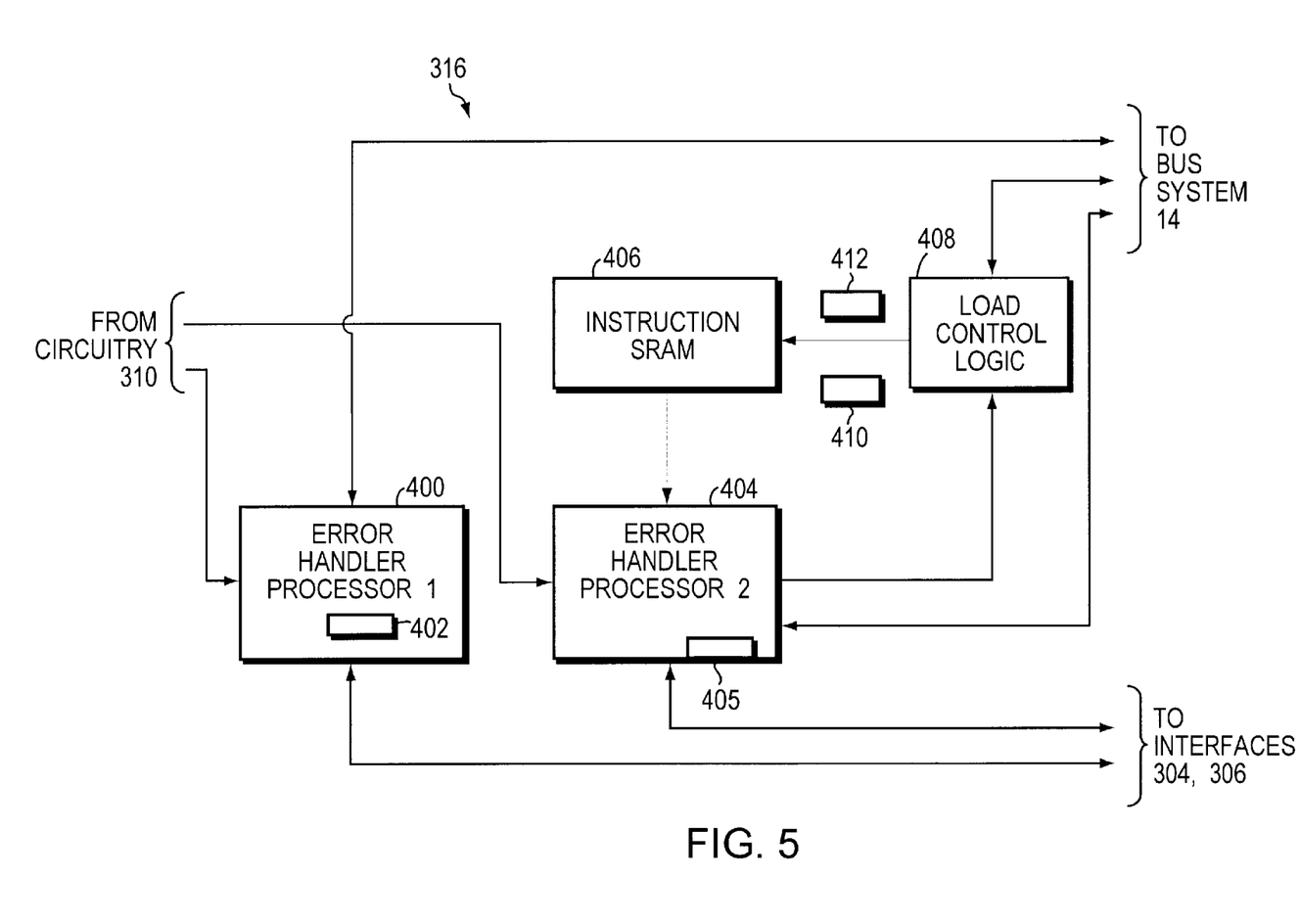
FIG. 5 is a high level schematic block diagram illustrating functional components of memory array error handler circuitry that may be comprised, in a memory controller in the memory region of FIG. 4.

With particular reference being made to FIGS. 3–5, illustrative embodiments of the present invention that may be used to advantage in the cache memory 16 of the system 112 will now be described. Memory 16 is segmented into a plurality of memory regions 200, 202, 204, and 206. Each of these regions 200, 202, 204, 206 is coupled to the bus system 14. It is important to note that although not shown in the Figures, in practical implementation of system 112, the actual number of the memory regions into which the memory 16 is segmented may be significantly greater (e.g., 2 to 4 times greater) than the four regions 200, 202, 204, 206 shown in FIG. 3.

The memory regions 200, 202, 204, 206 may be essentially identical in their respective constructions and operations. Accordingly, in order to avoid unnecessary redundancy in the Description, the functional components and operation of a single one 200 of the memory regions 200, 202, 204, 206 will be described herein.

As illustrated in FIG. 4, memory region 200 includes a memory array 301 that is electrically coupled to two memory I/O controllers 300, 302. More specifically, array 301 includes two sets 304, 306 of command and data interfaces; these interfaces 304, 306 are electrically coupled to each of the controllers 300, 302. The controllers 300, 302 are also coupled to bus system 14 and monitor circuitry 312. Controllers 300, 302 are also coupled to respective maintenance and configuration control circuitry 310, 314 with which the controllers 300, 302 are respectively associated. Circuitry 310, 314 is also coupled to bus system 14. As will be described more fully below, each of the controllers 300, 302 additionally includes respective memory array error handler circuitry 316, 318 wherein one embodiment of the present invention may be practiced to advantage.

The I/O controllers 300, 302 execute memory access requests (i.e., requests to read data stored in, or to write data into, memory banks 308) received from the host controllers 22 . . . 24 and disk controllers 18 . . . 20. In response to the receipt by one of the memory I/O controllers (e.g., controller 300) of such a memory access request from one of the host controllers (e.g., host controller 22), I/O controller 300 receiving the request arbitrates with the other I/O controller 302 for grant of exclusive access to and control of the memory array 301. The I/O controller 300 accomplishes this by exchanging arbitration negotiation messages (commonly termed arbitration "tokens") with the other I/O controller 302 via monitor circuitry 312.

When one controller 300 has been granted exclusive access to and control of the memory array 301 via this arbitration process with the other controller 302, the controller 300 that has been granted such exclusive access and control transmits commands (hereinafter termed "access commands") to the interfaces 304, 306 that cause the memory access requested by the controller 22 to be executed. In order to accomplish this, the controller 300 may perform address decoding operations whereby a memory address supplied to the controller 300 by the host controller 22 as part of host controller's memory access request may be decoded by the I/O controller into a physical address in the memory region's memory array that corresponds to the address supplied by the host controller 22. That is, the address specified by the host controller 22 in its memory access request may indicate a logical address in the memory 16 and controller 300 may translate that logical address into a corresponding physical address in the memory banks 308 in order to execute the request. Information related to the configuration, size, etc. of the memory 16 and banks 308 that may be necessary to permit the controllers 300, 302 to perform such decoding operations may be stored in the circuitry 310, 314 and may be provided by the circuitry 310, 314 to the controllers 300, 302, respectively. Other functions of the I/O controllers 300, 302 include, among other things, temporary storage and transfer synchronization of data moving between the bus system 14 and the array 301, initiating refresh of the SDRAM in banks 308, and as will described more fully below, handling of error conditions that may arise in the array 301.

When the interfaces 304, 306 receive the access commands from the controller 300, the interfaces 304, 306 provide, in response to such commands, appropriate low level SDRAM control and access signals (e.g., chip select, clock synchronization, memory addressing, data transfer, memory control/management, clock enable signals, etc.) to the individual SDRAM integrated circuit devices (e.g., not shown) in the memory banks 308 that cause the memory access requested by the host controller 22 to be executed. If the memory access being requested by the host controller 22 involves reading data stored in the banks 308, that data may be transmitted from the banks 308 to the interfaces 304, and thence, to the controller 300. The controller 300 may then transmit the data to the controller 22 via the bus system 14.

Circuitry 310 and 314 provide various configuration storage, monitoring, and malfunction recovery functions in the region 200. For example, circuitry 310, 314 provides "watchdog" monitoring services that determine whether a failure condition may be present in the controllers 300, 302. In one of the watchdog services provided by the circuitry 310, 314, the circuitry 310, 314 may monitor the respective lengths of time that the controllers 300, 302 are granted control and access to the array 301. If one of the I/O controllers (e.g., controller 300) has been granted control and access to the array 301 for longer than a certain predetermined time period that may indicate that the controller 300 has failed, the circuitry 310 associated with that controller 300 may cause resetting of the controller 300, and may communicate the reason for this resetting of the controller 300 to the other monitoring circuit 314. Other critical conditions in and signals generated by the controllers 300, 302 may also be monitored by the circuitry 310, 314 to determine whether a failure condition is present in the controllers 300, 302, and if such failure condition is determined by the circuitry 310, 314 to be present, the circuitry 310, 314 may take appropriate action to correct the failure condition (e.g., including resetting the failed memory I/O controller or controllers). The circuitry 310, 314 may also store and provide to the respective controllers 300, 302, among other things, respective controller identification information (i.e., information that identifies the respective memory I/O controller, and SDRAM service cycle-related information (e.g., for initial SDRAM set-up, status checking, etc.).

Monitor circuitry 312 may receive "heartbeat" signals from the circuitry 310, 314 that indicate whether either circuitry 310 or circuitry 314 is in a normal mode of operation or has ceased to function properly. That is, when circuitry 312 receives from circuitry 310 proper heartbeat signals, the circuitry 312 determines that the circuitry 310 is in a normal mode of operation; however, if circuitry 312 fails to receive within a predetermined period of time such proper heartbeat signals from the circuitry 310, the circuitry 312 may determine that the circuitry 310 is no longer functioning properly. Similarly, when circuitry 312 receives from circuitry 314 proper heartbeat signals, the circuitry 312 determines that the circuitry 314 is in a normal mode of operation; however, if circuitry 312 fails to receive within a predetermined period of time such proper heartbeat signals from the circuitry 314, the circuitry 312 may determine that the circuitry 314 is no longer functioning properly. If the circuitry 312 determines that either circuitry 310 or circuitry 314 is not functioning properly, it may also be assumed that controller 300 or controller 302 associated with the malfunctioning circuitry 310 or 312, respectively, is also not functioning properly. Therefore, if circuitry 312 determines that one of the circuits 310 or 314 is not functioning properly (e.g., circuit 314), the circuitry 312 may cease exchanging arbitration tokens between the controllers 300, 302, may grant control the array 301 to the controller 300 that is not associated with the malfunctioning circuit 314, and may cause the malfunctioning circuitry 314 and the controller 302 associated with such malfunctioning circuitry 314 to be reset into normal modes of operation.

In region 200, when the memory array 301 encounters an error condition, one set of the command and data interfaces (e.g., interfaces 304) may detect, using conventional techniques, the occurrence of the error condition and may report such occurrence to the active I/O controller 300. Examples of error conditions that may be detected and reported by the command and data interfaces 304, 306 include the occurrence of parity errors in the data values transmitted by the command/control signal busses, the failure of a requested directed memory access to complete within a predetermined "timeout" period, etc. The interfaces 304, 306 signal the occurrence of the error condition by asserting an error signal line (not specifically referred to in the Figures) that is coupled to the active I/O controller 300. The assertion of the error signal line merely indicates that an error condition has been detected in the memory array 301, but does not indicate the nature or type of error condition detected.

Each of the controllers 300, 302 includes respective error handler circuitry 316, 318. The functional components and operation of circuitry 316 are identical to those of circuitry 318. Accordingly, only the functional components and operation of the circuitry 316 in the active controller 300 will be described herein, in order to avoid unnecessary redundancy in the Description. It is important to note, however, that only the error handling circuitry of the currently active memory I/O controller in a memory region is involved in handling an error condition reported by the region's memory array.

With particular reference now being made to FIGS. 4–5, the functional components and operation of error handler circuitry 316 will be described. Circuitry 316 comprises two error handler processors 400, 404. Each of the processors 400, 404 is electrically coupled to the interfaces 304, 306, to bus system 14, and to the respective maintenance and configuration control circuitry 310 with which the I/O controller 300 comprising the error handling circuitry 316 is associated. Processor 404 is also electrically coupled to program instruction asynchronous static RAM (SRAM) 406 and to program instruction SRAM load control logic 408. Logic 408 is also coupled to bus system 14. Although SRAM 406 and logic 408 are shown in FIG. 5 as being part of the circuitry 316, if region 200 is appropriately modified in ways apparent to those skilled in the art, the SRAM 406 and logic 408 may comprise circuit elements distinct from the I/O controllers.

The processors 400, 404 in the active controller 300 are configured to detect, during operation of the active controller 300, the assertion by interfaces 304, 306 of the error condition line. In accordance with this embodiment of the present invention, only one of the two processors 400, 404 in the active controller 300 is enabled at any given time to handle the error condition reported by the assertion of the error condition line. That is, only one of the two processors 400, 404 in active controller 300 is selected at any given time to handle an error condition reported from the array 301.

In region 200, the circuitry 310 may provide control signals to the processors 400, 404 in controller 300 that select which of the two processors 400, 404 in controller 400, 404 is to handle an error condition reported from the array 301. The nature of the control signals supplied by circuitry 310 to the processors 400, 404 in circuitry 316 may be selected by control signals supplied to the circuitry 310 from one or more of the host controllers 22 . . . 24, disk controllers 18 . . . 20, or an external computer device 500. That is, one or more of the host controllers 22 . . . 24, disk controllers 18 . . . 20, or external device 500 may program the circuitry 310 (e.g., during a service cycle of the memory banks 308) as to which of the two processors 400, 404 is to be enabled by the circuitry 310 to handle the error condition reported from the array 301. Device 500 may be coupled to the bus system 14 or may be coupled to the circuitry 310, 314 via a serial communication link 506. Alternatively, or in addition thereto, the system 112 may be configured to permit one or more of the host controllers 22 . . . 24, disk controllers 18 . . . 20, or external device 500 to supply control signals to the processors 400, 404 that select which of the two processors 400, 404 is to handle the error condition reported from the array 301. Further alternatively, the circuitry 310 may be hardcoded to select one of the two processors 400, 404 to handle the error condition.

Similarly, if controller 302 is the currently active controller, the circuitry 314 may provide control signals to the error handler processors in circuitry 318 that select which of these processors is to handle an error condition reported from the array 301. The nature of the control signals supplied by circuitry 314 to the error handler processors in circuitry 318 may be selected by control signals supplied to the circuitry 314 from one or more of the host controllers 22 . . . 24, disk controllers 18 . . . 20, or the external computer device 500. That is, one or more of the host controllers 22 . . . 24, disk controllers 18 . . . 20, or external device 500 may program the circuitry 314 as to which of the two processors 400, 404 in controller 302 is to handle the error condition reported from the array 301. Alternatively, or in addition thereto, the system 112 may be configured to permit one or more of the host controllers 22 . . . 24, disk controllers 18 . . . 20, or external device 500 to supply control signals to the error handler processors in circuitry 318 that select which of these two processors is to handle the error condition reported from the array 301. Further alternatively, the circuitry 314 may be hardcoded to select one of the error handler processors in circuitry 302 to handle the error condition.

In response to the assertion of the error signal line, the error handler processor that is currently selected to handle the error condition (hereinafter termed the "selected processor") may report the occurrence of the error condition to the host controller 22. The selected processor may also execute one or more error handler routines to try to determine the cause and/or nature of the error condition, and to try to correct the error condition. More specifically, these error handler routines may cause the active controller 300 to perform, among other things, empirically-determined operations upon the SDRAM devices in the banks 308 and the interfaces 304, 306 that may cause these components of the array 301 to change their respective states and generate outputs related thereto so as to permit the selected processor and/or other components of the active I/O controller and/or system 112 to be able to examine these outputs to try to determine therefrom the cause of the error condition, and based upon this information, to continue to manipulate the respective states of the components of the array 301 until the outputs from these components indicate that the error condition has been corrected.

If the selected processor is processor 400, then the one or more error handler routines executed by the processor 400 may be statically preprogrammed into a program instruction read only memory (ROM) 402 comprised in the processor 400. The routines may be programmed into ROM 402 when the system 112 is initially configured, and may be accessed and implemented by the processor 400 to handle error condition when the processor 400 is the selected processor and to otherwise cause the processor 400 to operate in the manner described herein. Alternatively, the processor 400 may comprise a programmable logic device that may be hardcoded to implement the one or more routines and to otherwise cause the processor 400 to operate in the manner described herein.

Conversely, if the selected processor is processor 404, then the one or more error handler routines executed by the processor 404 may be dynamically programmed and modified in SRAM 406. More specifically, processor 404 may command program instruction load logic 408 to request from one of the host controllers 22 . . . 24, disk controllers 18 . . . 20, or external device 500 a first set of program instructions (symbolically referred to by numeral 410) that include or embody the one or more error handler routines to be downloaded to and stored in the SRAM 406. In response to the request from the logic 408, the one of the host controllers 22 . . . 24, disk controllers 18 . . . 20, or external device 500 to which the request was made may download to the logic 408 the first set of instructions 410. When the logic 408 receives the instructions 410, the logic 408 may cause the instructions 410 to be loaded and stored in the SRAM 406. After the instructions 410 have been stored in the SRAM 406, the processor 404 may access and execute the one or more error handler routines included or embodied in the instructions 410 to handle the error condition according to those one or more routines.

Thereafter, if it is desired to handle the current error condition or another error condition reported by the array according to a different set of error handler routines, one of the host controllers 22 . . . 24, disk controllers 18 . . . 20, or external device 500 may command the processor 404 to command the logic 408 to receive and store in the SRAM 406 a second set of program instructions (symbolically referred to by numeral 412) from the one of the host controllers 22 . . . 24, disk controllers 18 . . . 20, or external device 500 from which the command to the processor 404 was given. Alternatively, the processor 404 may be programmed to automatically command the logic 408 to request, in response to detection by the processor 404 of a data consistency error in the instruction SRAM 406, a fresh download of program instructions from one of the host controllers 22 . . . 24, disk controllers 18 . . . 20, or external device 500. In either case, the new set of instructions 412 received by the logic 408 is stored in the SRAM 406; this may involve the overwriting of some or all of the first set of instructions 410 that was previously stored in the SRAM 410.

The second set of instructions 412 may include or embody one or more error handler routines that are different, at least to some degree, from those included or embodied in the first set of instructions 410. After the instructions 412 have been stored in the SRAM 406, the processor 404 may access and execute the one or more error handler routines included or embodied in the instructions 412 to handle an error condition according to those one or more routines. The manner in which an error condition is handled by the processor 404 when the processor 404 executes the one or more error handler routines included or embodied in the instructions 410 may be different from the manner in which an error condition is handled by the processor when the processor 404 executes the one or more error handler routines included or embodied in the instructions 412.

One of the host controllers 22 . . . 24, disk controllers 18 . . . 20, or external device 500 may also command the processor 404 to branch or jump to and execute a specific instruction or series of instructions previously stored in the SRAM 406. Advantageously, this permits even more flexibility in the handling of error conditions according to the present invention.

Although not shown in the Figures, in practical implementation of region 200, the memory array 301 may be comprised in a single circuit board card (not shown). The controllers 300, 302, and circuitry 310, 312, 314 may be comprised in a printed circuit mother board (not shown). The card and the mother board may be adapted to be electrically and mechanically mated together via conventional means so as to permit the controllers 300, 302 and the array 301 to exchange data, command, and other signals in the manner described above.

Each of the controllers 300, 302 may be comprised in a respective application specific integrated circuit (ASIC).

Circuitry 310 and circuitry 314 may each comprise respective programmable logic and/or microprocessor devices configured to carry out the operations described above as being carried out by circuitry 310, 314, respectively. Circuitry 312 may comprise a programmable array logic device configured to carry out the operations described above as being carried out by circuitry 312.

Additionally, the external computer device 500 and processor 404 may include respective computer-readable memories 504, 405 that store respective software programs and data structures associated with, and for carrying out the inventive and other functions, methods, techniques, and operations described herein as being carried out by the device 500 and processor 404. Although not shown in the Figures, the device 500 includes a respective processor that, along with processor 404, is configured to execute these software programs and manipulate these data structures. The execution of the software programs by the processor in device 500 and the processor 404 may cause and facilitate the inventive and other functions, methods, techniques, and operations described herein as being carried out by the device 500 and processor 404. It will be apparent to those skilled in the art that many types of processors and memories may be used according to the teachings of the present invention to implement said invention.

Thus, it is evident that there has been provided, in accordance with the present invention, an error handling technique that fully satisfies the aims and objectives, and achieve the advantages, hereinbefore set forth. The terms and expressions which have been employed in this application are used as terms of description and not of limitation, and there is no intention, in the use of such terms and expressions, of excluding any equivalents of the features shown and described or portions thereof, but it is recognized that various modifications are possible within the scope of the invention as claimed. For example, if appropriately modified in ways apparent to those skilled in the art, the mechanism that selects which of the two error handler processors in a given I/O controller to handle an error condition may be integrated into the I/O controller itself. That is, each controller 300, 302 may comprise respective selector circuitry 350 that selects (e.g., as a result of execution of program instructions stored in a computer-readable memory (not shown) comprised in selector 350) which of the two respective processors contained in the respective controller's error handler circuitry 316, 318 is to handle the error condition.

Other modifications are also possible. Accordingly, the present invention should be viewed broadly as encompassing all modifications, variations, alternatives and equivalents as may be encompassed by the hereinafter appended claims.

What is claimed is:

1. Memory controller comprising:
a first processor that may be used to handle a memory device error condition according to one or more statically preprogrammed error handling routines; and
a second processor that may be used to handle the error condition according to one or more dynamically programmable error handling routines;
wherein the first processor and the second processor may be controlled so as to select which of the first processor and the second processor to handle the error condition.

2. Memory controller according to claim 1, further comprising:
a selector that selects the one of the first processor and the second processor that is used to handle the error condition.

3. Memory controller according to claim 1, wherein the first and second processor may be controlled by a device that is external to the controller so as to select which of the first processor and the second processor is used to handle the reported error condition.

4. Memory controller according to claim 3, wherein the error condition is reported to the memory controller by a memory device that is controlled by the memory controller, and the device that is external to the controller may be used to exchange data between the memory device and one of a computer system and at least one mass storage device.

5. Memory controller according to claim 1, also comprising a memory that, during operation of the controller, may store a first set of instructions received from a device external to the controller, the first set of instructions when executed by the second processor causing the second processor to handle the error condition in a first manner.

6. Memory controller according to claim 5, wherein, after the memory has received and stored the first set of instructions, the memory may store, during the operation of the controller, a second set of instructions received from the device, the second set of instructions being different from the first set of instructions, the second set of instructions when executed by the second processor causing the second processor to handle the error condition in a second manner, the first manner being different from the second manner.

7. Method of operating a memory controller, the memory controller including a first processor and a second processor, the method comprising:
selecting one of the first processor and the second processor to handle a memory device error condition;
wherein if the first processor is selected to handle the error condition, the first processor handles the error condition according to one or more statically preprogrammed error handling routines; and
if the second processor is selected to handle the error condition, the second processor handles the error condition according to one or more dynamically programmable error handling routines.

8. Method according to claim 7, wherein a selector comprised in the controller selects the one of the first processor and the second processor to handle the error condition.

9. Method according to claim 7, a device that is external to the controller selects the one of the first processor and the second processor to handle the error condition.

10. Method according to claim 9, wherein the error condition is reported to the memory controller by a memory device that is controlled by the memory controller, and the device that is external to the controller may be used to exchange data between the memory device and one of a computer system and at least one mass storage device.

11. Method according to claim 7, also comprising:
storing in a memory, during operation of the controller, a first set of instructions received from a device external to the controller, the first set of instructions when executed by the second processor causing the second processor to handle the error condition in a first manner.

12. Method according to claim 11, also comprising, after the memory has received and stored the first set of instructions:
storing in the memory, during the operation of the controller, a second set of instructions received from the device, the second set of instructions being different from the first set of instructions, the second set of instructions when executed by the second processor causing the second processor to handle the error condition in a second manner, the first manner being different from the second manner.

13. Computer-readable memory comprising computer-executable program instructions that when executed cause:

selecting of one of a first processor and a second processor to handle a memory device error condition, the first processor and the second processor being comprised in a controller;

wherein if the first processor is selected to handle the error condition, the first processor handles the error condition according to one or more statically preprogrammed error handling routines; and if the second processor is selected to handle the error condition, the second processor handles the error condition according to one or more dynamically programmed error handling routines.

14. Computer-readable memory according to claim 13, wherein a selector comprised in the controller selects the one of the first processor and the second processor to handle the error condition.

15. Computer-readable memory according to claim 13, wherein a device that is external to the controller selects the one of the first processor and the second processor to handle the error condition.

16. Computer-readable memory according to claim 13, wherein the instructions, when executed, also cause:

storing in another memory, during operation of the controller, a first set of instructions received from a device external to the controller, the first set of instructions when executed by the second processor causing the second processor to handle the error condition in a first manner.

17. Computer-readable memory according to claim 16, wherein the instructions comprised in the computer-readable memory, when executed, also cause:

storing in the memory, during the operation of the controller, a second set of instructions received from the device, the second set of instructions being different from the first set of instructions, the second set of instructions when executed by the second processor causing the second processor to handle the error condition in a second manner, the first manner being different from the second manner.

18. A memory device comprising:

a memory array;

a memory controller coupled to the memory array by an error signal line, over which error signals indicating an error condition associated with the memory array are transmitted to the memory controller from the memory array, the memory controller comprising:

a first error handling module including a memory portion having at least one statically programmed error handling routine that enables the first error handling module to handle an error condition; and a second error handling module including a memory portion for receiving at least one dynamically programmable error handling routine that enables the second error handling module to handle an error condition; and a selection device for selecting which one of the first and second error handling modules for handling a particular error condition.

* * * * *